United States Patent [19]

Hatfield

[11] Patent Number: 5,511,820

[45] Date of Patent: Apr. 30, 1996

[54] PORTABLE MOTOR VEHICLE SAFETY AIRBAG

[76] Inventor: J. Paul Hatfield, 8501 Bucyrus Ct., Unit 101, Manassas, Va. 22110

[21] Appl. No.: 283,029

[22] Filed: Jul. 29, 1994

Related U.S. Application Data

[63] Continuation-in-part of Ser. No. 157,736, Nov. 24, 1993, Pat. No. 5,333,902.

[51] Int. Cl.$^6$ ................................................ B60R 21/18
[52] U.S. Cl. .................................. 280/733; 280/728.1
[58] Field of Search ............................... 280/733, 728 R, 280/801.1, 808

[56] References Cited

U.S. PATENT DOCUMENTS

| 3,706,462 | 12/1972 | Lilly | 280/733 |
| 4,971,354 | 11/1990 | Kim | 280/733 |
| 5,242,193 | 9/1993 | Humpal | 280/733 |

FOREIGN PATENT DOCUMENTS

| 3820145 | 1/1990 | Germany | 280/733 |
| 1416517 | 12/1975 | United Kingdom | 280/733 |

*Primary Examiner*—Margaret A. Focarino
*Assistant Examiner*—Christopher Ellis
*Attorney, Agent, or Firm*—Harold H. Dutton, Jr.

[57] ABSTRACT

A portable airbag device for use in an automotive vehicle having passenger seat belts therein, the device comprising a housing having a projecting male buckle element and a female buckle receiving element for insertion between the two buckle elements of the seat belt system, or the housing being adapted to be attached to the seatbelt so that the seatbelt forms an S-shaped path for exerting tensile force against the elements forming the bends in the path, the housing also including a source of compressed gas and a sensor for detecting the occurrence of a collision, an inflatable airbag connected to the source of compressed gas, and a releasable fastener for securing the airbag to the passenger seat belt and positioning the airbag in front of a user, whereby upon occurrence of a collision, the sensor detects the collision and inflates the airbag.

7 Claims, 3 Drawing Sheets

PORTABLE MOTOR VEHICLE SAFETY AIRBAG

CROSS-REFERENCE TO RELATED APPLICATION

This application is a continuation-in-part of my co-pending U.S. patent application Ser. No. 08/157,736 filed Nov. 24, 1993, now U.S. Pat. No. 5,333,902 issued Aug. 2, 1994.

This invention relates to a motor vehicle safety airbag. More particularly, the invention relates to an airbag which is portable in the sense that it can be moved from one vehicle to another, whereby it can be used with vehicles which are not originally equipped with safety airbags.

BACKGROUND AND OBJECTS OF THE INVENTION

In recent years, motor vehicle safety standards have been instituted which require that all new motor vehicles intended for ordinary passenger car use must be equipped with inflatable "air bags" for the protection of the occupant. Initially, the requirements have been met by providing a single airbag for driver protection, but ultimately both driver and passenger, and perhaps middle-seat passenger airbags will be required.

The technology used with airbags has been known in the patent art for a number of years, and many variations have been developed for airbags. Thus, some devices are made to protect the occupant from frontal injuries, while others protect from both frontal and side injuries. Some devices are built into the dashboard or steering wheel of the vehicle, while others are produced in combination with the seat belt.

For example, U.S. Pat. No. 5,062,662 provides an airbag which is integral with the lap belt, and U.S. Pat. No. 4,971,354 provides such an airbag integral with a shoulder belt.

Unfortunately, in spite of the demonstrated ability of airbags to reduce serious injury in the event of a collision, many vehicles manufactured prior to current safety standards are still in use. In addition, many trucks are not within the scope of the requirements for airbags, so that no airbag protection is available for such trucks. Thus, there are a great many vehicles currently in use, and which will be in use for many years, which do not have airbags, and which cannot be easily retrofitted with airbags.

On new vehicles, the airbags are integrated into the dashboard or the steering wheel of the vehicle, where compartments for the airbags may be fitted and yet concealed so as to present an unobtrusive appearance. However, the cost to install airbags on older vehicles would be quite high, and the older the vehicle may be, the less likely the owner would be to pay for such an expensive installation.

Further, it is important that the vehicle occupant use the seat belt in vehicles equipped with airbags in order to minimize or avoid injury from the airbag itself, as well as to minimize injury in the event of a collision. Experience has shown that deployment of the airbag itself may cause injury, although generally such injury is minor in relation to the injury caused in a collision. In general, the airbag is positioned in such a manner that when it deploys, it moves toward the occupant it is intended to protect in order to urge the occupant back toward the seat.

The primary object of the present invention is to provide an airbag which may be used with older model vehicles to provide occupant protection.

Another object of the invention is to provide an airbag which may be transferred from one vehicle to another without vehicle modification.

Still another object of the invention is to provide an airbag which can be used either on the driver or passenger side of a vehicle.

Yet another object of the invention is to provide an airbag which may be used on vehicles which were not originally equipped with airbag occupant protection.

A further object of the invention is to provide an airbag which is intended to expand away from the user rather than toward the user upon deployment.

Still a further object of the invention is to provide a portable safety airbag which may be used in any vehicle having seat belts.

Yet a further object of the invention is to provide a portable safety airbag which may be used in any seat-belt equipped position of a vehicle, including the rear seats of automobiles, vans, buses, etc.

These and other objects and advantages of the invention will become apparent from a detailed consideration of the invention as described in the following description and claims.

DESCRIPTION OF THE INVENTION

The airbag of the present invention is a device which is portable in the sense that it can be transferred from one vehicle to another without modification of the vehicle. The airbag device is intended to be used in combination with a conventional seat belt, and as such it is useable on any vehicle which is equipped with seat belts. Thus, the device may be used with small or large trucks or even with, for example, agricultural or industrial tractors, vans, buses, airplanes, etc. so long as the vehicle is provided with seat belts.

One embodiment of the airbag device is used between the two buckle components of the seat belt system on the vehicle. Conventional seat belts have a male projecting buckle element and a female buckle element into which the male element is releasably inserted. Typically, the female buckle element is anchored to the floor of a vehicle, while the male buckle element is attached to the end of the belt. The belt is withdrawn from a seat belt retractor and extended around the user, until the male buckle element is inserted into the female buckle element. The airbag device of this invention is adapted to be inserted in between the male and female buckle elements. Thus, the airbag device has a male buckle element on one end and a female buckle element on the other end. In this manner, the device is inserted between the male and female buckle elements of the seat belt.

Extending from the device is an elongated receptacle which ordinarily houses the actual inflatable bag. The receptacle is of a sufficient length to extend upwardly in front of the user to a position preferably approximately in front of the chest of the user. The receptacle is provided with an attaching strap secured by a hook-and-loop fastener for securing the receptacle around the belt and holding the receptacle in this position.

The buckle housing is provided with a sensing system for detecting a collision event in order to deploy the airbag. This sensing system may take a number of different forms. For example, a tension sensor may be used to detect the amount of tension applied on the device between the male and female buckle elements. When this tension exceeds a predefined limit, as when a user is thrust forward during a collision, the airbag is deployed.

Other types of sensing systems could also be used such as, for example, a strain gauge to detect the amount of tension, or a sensor associated with the bag receptacle for detecting the pressure exerted against the belt by the users body and sending a signal to the actuating means in the buckle housing.

The airbag housing also preferably houses the gas used to inflate the airbag in a small canister within the housing. Alternatively, the device could be connected to a remote canister which could be stored on or beneath the users seat in any convenient location, and connected by a tubing to the airbag.

In another embodiment of the portable safety airbag, the airbag and the gas supply is fully contained in a housing which is attached to the seatbelt itself between the ends of the belt. By means of the particular attaching arrangement, the housing is attached to the belt in such a manner as to detect excessive tension on the belt, as in a collision. Upon the occurrence of a collision, a sensor causes the release of the gas and inflation of the airbag. In this embodiment, when the airbag is inflated, it expands away from the user and toward whatever surface may be in front of the user, such as the dash board, steering wheel, back of another seat, etc. While this embodiment may be used either on a lap belt or a shoulder belt, better protection is generally obtained by using the invention on the shoulder portion of the belt system.

DESCRIPTION OF THE DRAWINGS

The invention will be described in greater detail in reference to the accompanying drawings which show by way of non-limiting example, preferred embodiments of the invention, and in which.

DETAILED DESCRIPTION OF PREFERRED EMBODIMENTS

Figure 1:
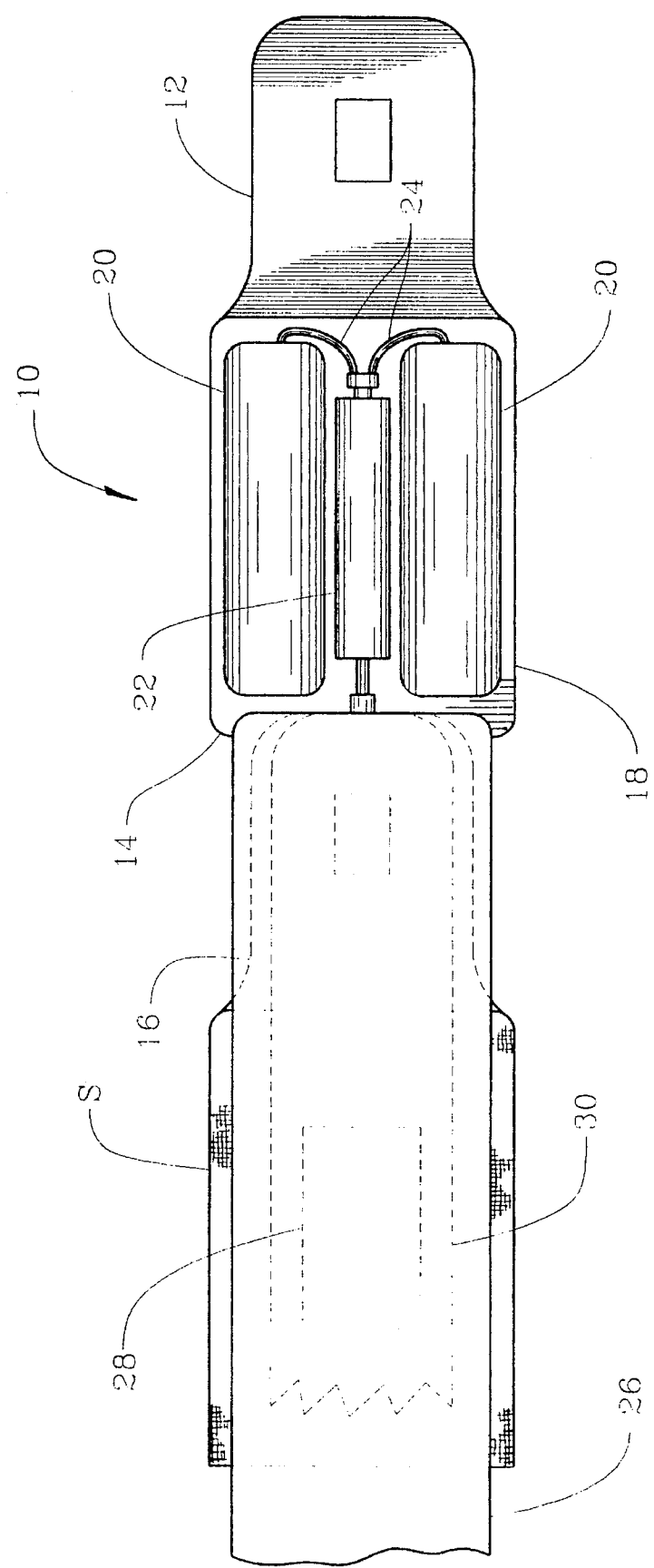
FIG. 1 is a plan view of the safety airbag device according to the invention.

Referring to FIG. 1, the safety airbag device according to the invention is generally designated 10, and is seen to be provided with a male buckle 12 and a female buckle receptacle element 14. The male tab 12 is adapted to be inserted into the conventional female belt receptacle in a motor vehicle (not shown) while the female receptacle 14 of the invention is adapted to receive the conventional male buckle element 16 of the motor vehicle seat belt S.

The device 10 includes a housing 18 which is adapted to house compressed gas cartridges 20 and a sensor mechanism 22 which is connected by means of conduits 24 to the cartridges 20. The sensor mechanism 22 is appropriately connected to or mounted on the housing 18, so that in the event of a collision, the sensor mechanism 22 causes a release of the compressed gas into an airbag housed within the elongated receptacle or pouch 26. The receptacle or pouch 26 is secured in place to the seat belt S by any suitable means, particularly such as a strip 28 of hook-and-loop fastener with a complementary strip secured to the seat belt. Alternatively, a strip may be positioned so as to encircle the seat belt S and be secured thereto by similar fastener material on the strip. In this manner, the pouch 26 would be free to slide slightly around the seat belt. The pouch 26 is of any suitable construction which houses the airbag 30 in a deflated state, but opens to release the airbag and allow it to inflate in a collision. Alternatively, the airbag may simply be folded to the stored condition and secured in that position by releasable fasteners, for release upon collision.

In use, the buckle element 16 of the seat belt S is inserted into the female buckle portion 14 of the airbag device, and the male portion 12 is inserted into the female receiving portion of the seat belt. The pouch 26 containing the airbag then extends along the seat belt and is secured to the belt. Essentially the pouch is of minimal thickness when the airbag is in the uninflated state, and is of a width approximately the same as the seat belt. The length is such as to position the airbag 30 appropriately with respect to the average user. When the user changes to a different vehicle, the buckles are released in the usual manner and the fastener element is removed from the belt, so that the airbag device is easily transported to another vehicle and reinstalled.

The sensor system 22 may be any appropriate means for detecting the occurrence of a collision. For example, the sensor may detect the tensile force between the buckle 16 and the receptacle 14, and upon reaching a predetermined force trigger the release of the compressed gas so as to inflate the airbag 30.

Figure 2:
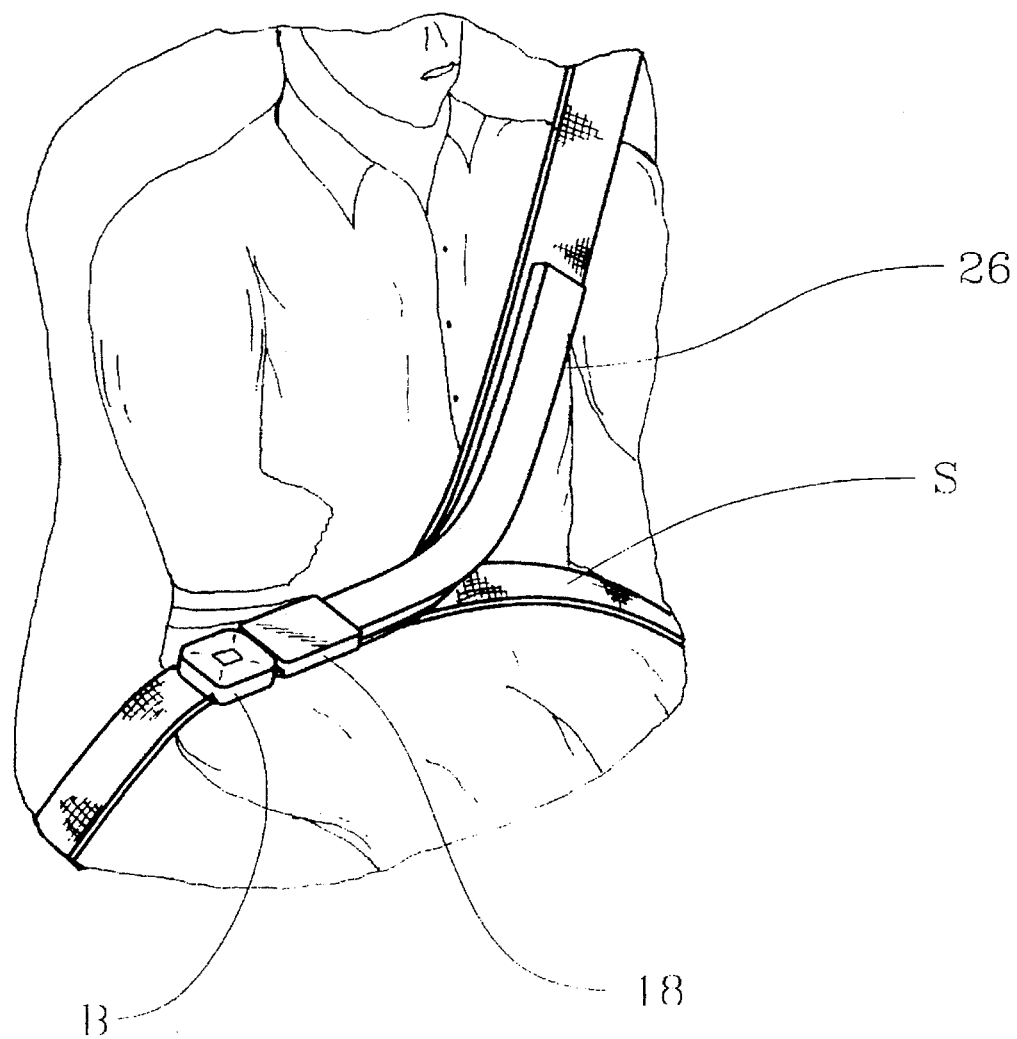
FIG. 2 is a schematic representation illustrating the manner in which the safety airbag device is used by a vehicle occupant.

Referring to FIG. 2, the airbag device is shown in an installed position and in use by a passenger in an automobile. The housing 18 is shown installed between the female buckle element B and the belt S of a typical automotive seat belt system. The pouch 26 containing the airbag (not shown) extends upwardly along the shoulder harness portion of the seat belt system, in order that the airbag be positioned in front of the chest of the user. In the event of a collision, the sensor mechanism triggers the release of the compressed gas from the canisters 20, thereby inflating the airbag in a known manner.

Figure 3:
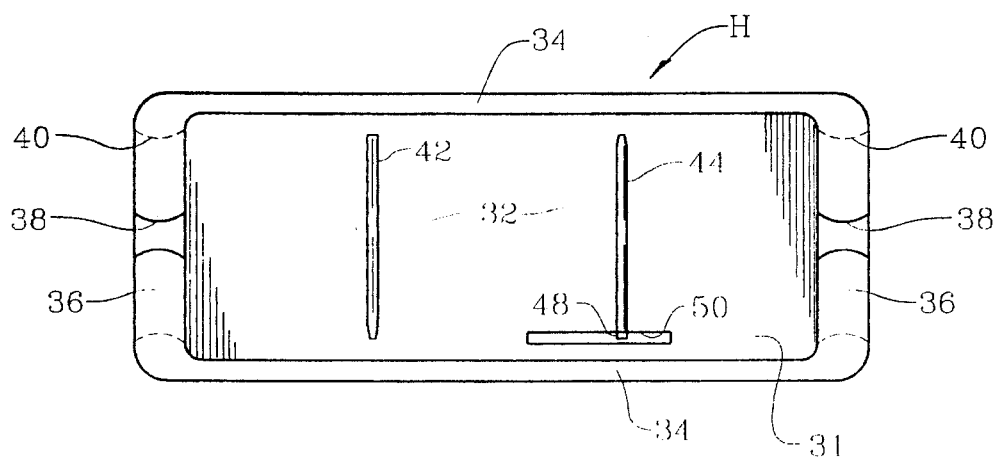
FIG. 3 is a rear plan view of an alternate embodiment of the invention with the seat belt removed.
Figure 4:
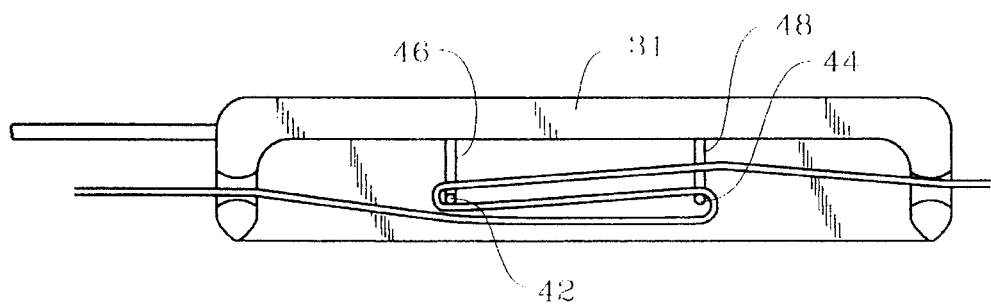
FIG. 4 is a side-elevational view of the embodiment of FIG. 3 showing a seatbelt in place.
Figure 5:
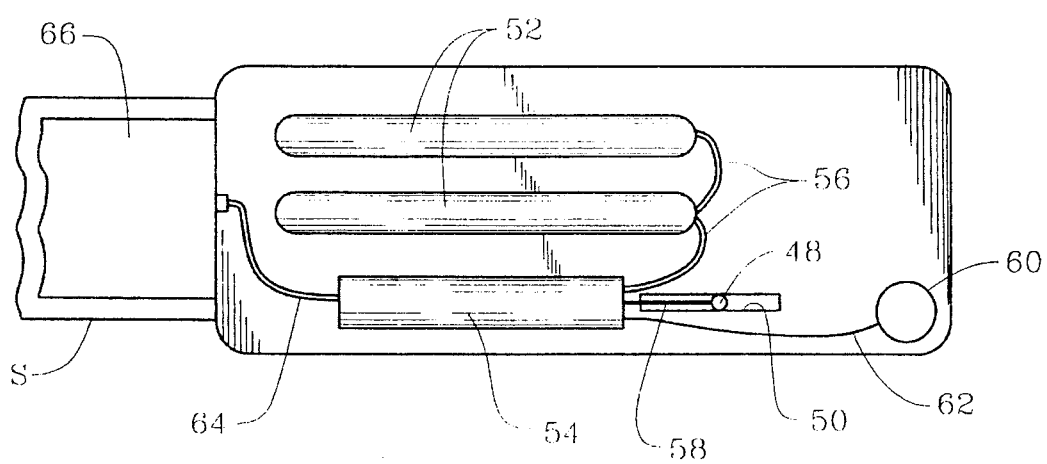
FIG. 5 is a top plan view with the cover removed showing the internal parts of the device.

Referring to the embodiment of FIGS. 3 and 4, a slightly different form of the invention is shown, and rather than having seatbelt buckle connections, this embodiment is intended to be attached to the belt at a point other than at the buckle. Oftentimes, the buckle may be located to the side of the user rather than in front of the user, and in such cases this embodiment may be preferable.

In this embodiment, a housing generally designated H includes a frame portion 31 having a rear cavity 32 defined by side walls 34 and end walls 36. The end walls 36 have openings 38 which connect to slots 40. The openings 38 enable the insertion of the seatbelt into the housing so that it is positioned in the slot 40, which is slightly longer than the width of the seatbelt.

A pair of seatbelt guide members 42 and 44 are positioned in the cavity so that they are parallel to each other and transverse to the length of the seatbelt. The guide members may simply be cylindrical rods or may be rollers. One of the guide members 42 is securely anchored to the housing H by a support post 46 secured to the frame portion 31. This can be in the nature of a cantilever, whereby only one end is fastened to the housing H, or may have a removable connection (not shown) at the other end for securing the other end to the housing as well.

The other guide member 44 includes a trigger portion 48 at its end which extends orthogonally to the guide member 44 and passes through a Slot 50 in the housing H. As in the previous embodiment, the housing houses compressed gas cartridges 52 and a sensor mechanism 54 which is connected by means of conduits 56 to the cartridges 52. This trigger portion of the guide member 44 extending through the slot 50 connects to the sensor mechanism 54 through an actuator member 58. The slot 50 is shown as to enable movement of the guide member 44, but clearly the nature and extent of the movement will be controlled by the particular type of sensor used. Thus, a mechanical sensor might require a greater extent of movement, whereas an electrical sensor might only require a very slight degree of movement. A sensor may, for example, detect the tensile force between the guide members 42 and 44.

In the case of an electrical or electronic sensor, an adjustment may be provided by means of a variable electronic component such as a variable resistor or capacitor adjustable by means of a knob 60 connected by a line 62 to the control 54. The control 54 also establishes the connection of the gas supply through line 64 to the airbag 66 overlying a seatbelt S.

The airbag may be housed beneath a cover (not shown) within the housing H or may extend outwardly from one end of the housing H and be attached along the seat belt similarly to the embodiment of FIG. 1. To use the device, the seatbelt is inserted into the cavity 32 through the openings 38 and is looped around the guide members 40 and 42 in an "S" path, as clearly seen in FIG. 4. In this manner, the housing H and the complete device of this invention will move with the belt during normal use, as the wearer might ordinarily move around in the vehicle. However, upon the occurrence of a collision, which causes the seatbelt to securely lock in place, the guide member 44 will then be able to move sufficiently with respect to the housing H to become a trigger and thereby activate the gas release from the canister into the airbag. When this happens, the airbag immediately inflates in a direction away from the user and, for example, toward the dashboard in front of the user for holding the user in place during the collision event.

It will be apparent that this device may be used either on the lap portion of the seatbelt or on the shoulder portion of the seatbelt. The position may depend upon the precise configuration of the belt. Clearing, the most appropriate location for positioning the housing will be one which enables the airbag to be positioned directly in front of the user. This may also vary with different users according to their size. For children, when the seatbelt is extended to a lesser extent, the position of the device may be different than for large adults when the seatbelt is fully extended.

A safety indicator may also be provided to show the state of charge of the gas canisters in the device. This may be a simple flag or indicator which would become visible when the gas pressure dropped to a level at which inflation of the airbag was too low or was in doubt.

In addition to allowing variation in the positioning of the device along the seatbelt, it is also possible to provide an adjustment of the sensor mechanism according to the weight of the user using the adjustable electronic component 60. For example, in the case of an electrical sensor using a sensor in the nature of a strain gauge or piezo type sensor, a simple dial adjustment would enable adjustment of the sensor circuitry according to the weight of the user.

While this invention has been described as having certain preferred features and embodiments, it will be understood that it is capable of still further variation and modification without departing from the spirit of the invention, and this application is intended to cover any and all variations, modifications and adaptations as may fall within the spirit of the invention and the scope of the appended claims.

I claim:

1. An airbag device for use in a vehicle having passenger seat belts therein, said device comprising a housing having a first guide member secured to said housing and a second guide member mounted so as to be movable with respect to said first guide member, said guide members being mounted to the housing in a cantilever configuration and said housing further comprising a recess sorted in the rear portion thereof and slots formed in the walls of said housing for receiving the side edge of a seatbelt passing from one of said slots, through an S-shaped path around said guide members to the other of said slots, said guide members being so mounted and positioned that the seat belt passing around both of said guide members is capable of exerting a force tending to relatively move said guide members in the event of a collision, said housing including a source of compressed gas and sensor means connected to said second guide member for detecting the relative movement of said guide members, an inflatable airbag adapted to receive gas from said source of compressed gas, whereby upon occurrence of a collision, said sensor means detects the collision and causes release of said compressed gas and inflation of said airbag.

2. An airbag device as in claim 1 and wherein said sensor means includes means for detecting the exertion of tensile force exceeding a predetermined value between said guide members.

3. An airbag device as in claim 2 and wherein said guide members each comprises a cylindrical roller member secured at one end to said housing.

4. An airbag device as in claim 3 and wherein said housing includes a trigger slot formed therein and trigger means connecting said second guide member and said sensor and passing through said slot.

5. An airbag device as in claim 3 and wherein said guide members are cantilevered with respect to said housing.

6. An automotive seat belt as in claim 1 and wherein said sensor means comprises means for detecting the force exerted between said first and second guide members and triggering the release of compressed gas and inflation of said airbag when the force detected exceeds a predetermined threshold value indicative of a collision.

7. An automotive seat belt as in claim 6 and including means for adjusting said threshold value.

\* \* \* \* \*